F. B. LEOPOLD.
PROPORTIONAL FEED DEVICE FOR FILTERS.
APPLICATION FILED FEB. 27, 1911.

1,175,067.

Patented Mar. 14, 1916.

WITNESSES.
INVENTOR.

F. B. LEOPOLD.
PROPORTIONAL FEED DEVICE FOR FILTERS.
APPLICATION FILED FEB. 27, 1911.
1,175,067.
Patented Mar. 14, 1916.
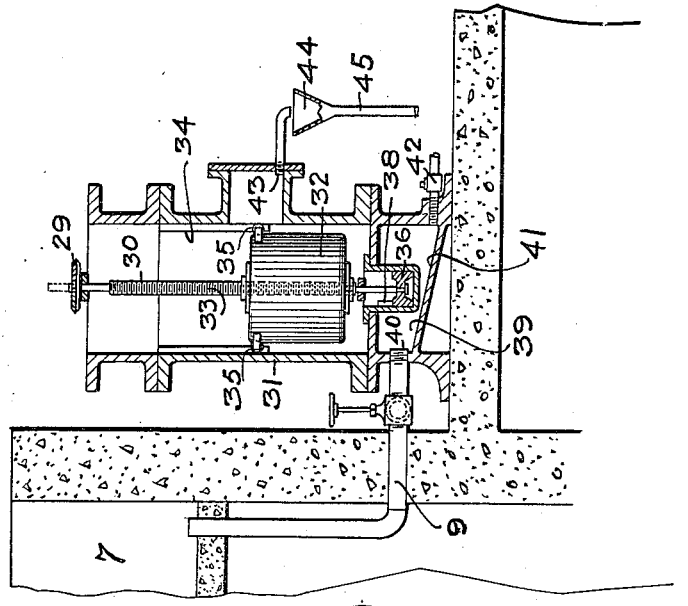
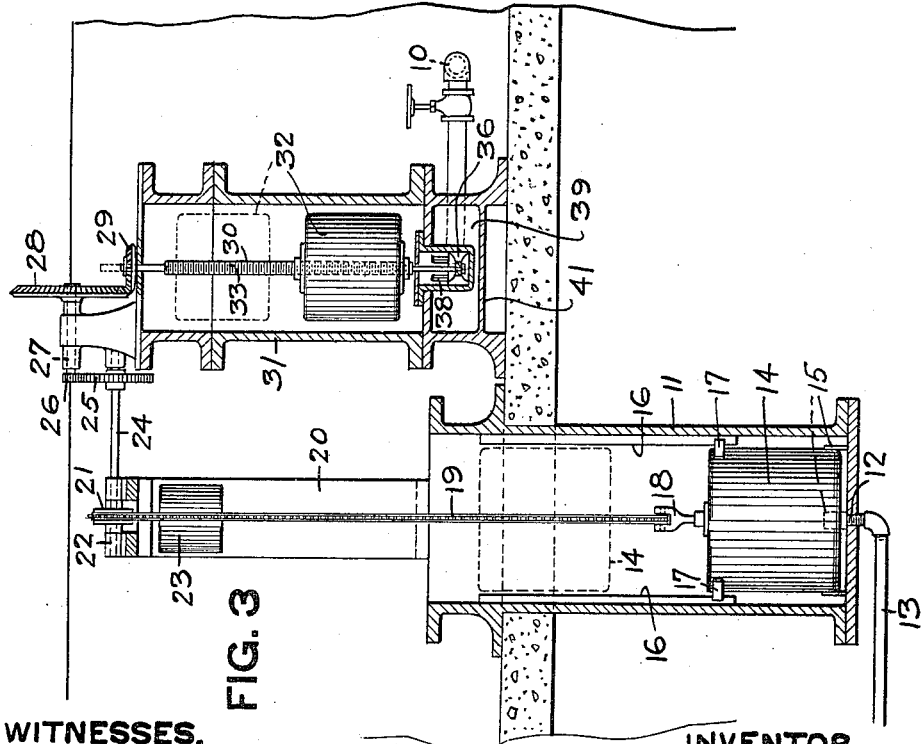

UNITED STATES PATENT OFFICE.

FREDERICK B. LEOPOLD, OF SEWICKLEY, PENNSYLVANIA.

PROPORTIONAL FEED DEVICE FOR FILTERS.

1,175,067. Specification of Letters Patent. Patented Mar. 14, 1916.

Application filed February 27, 1911. Serial No. 611,176.

*To all whom it may concern:*

Be it known that I, FREDERICK B. LEOPOLD, a citizen of the United States, resident of Sewickley, in the county of Allegheny and State of Pennsylvania, have invented a new and useful Improvement in Proportional Feed Devices for Filters; and I do hereby declare the following to be a full, clear, and exact description thereof.

My invention relates to proportional feed devices for fluids such as for controlling the supply of coagulant to the coagulating basin in filters so that the amount of coagulant fed to said basin will be in proper proportion to the amount of water going into said basin.

The object of my invention is to provide a feed device of this character in which the amount of coagulant fed to the coagulating basin will be accurately proportioned to the amount of water going to the basin, the device working automatically and when once properly set requiring no further attention.

To these ends my invention comprises the novel features hereinafter set forth and claimed.

Figure 1:
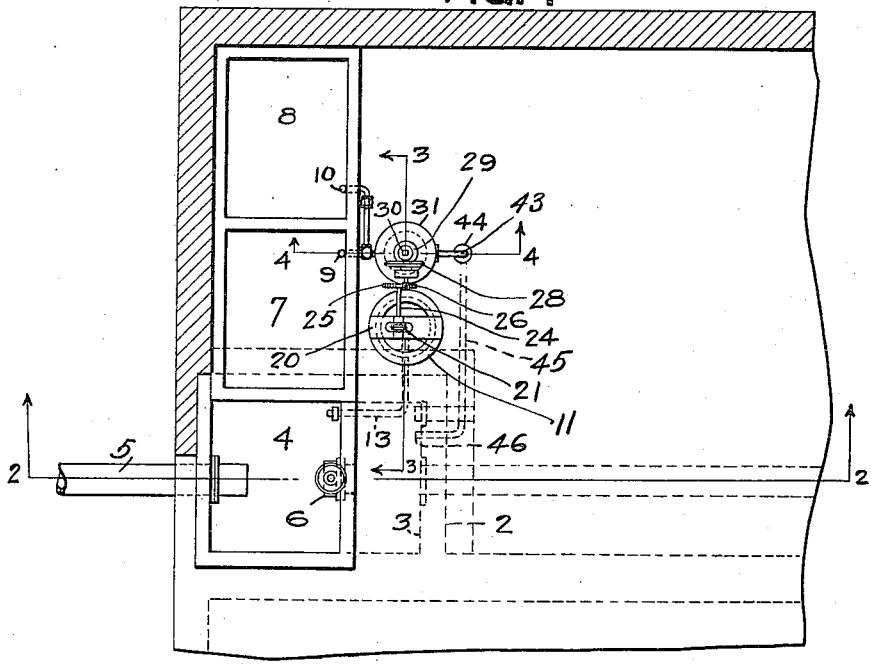
Figure 2:
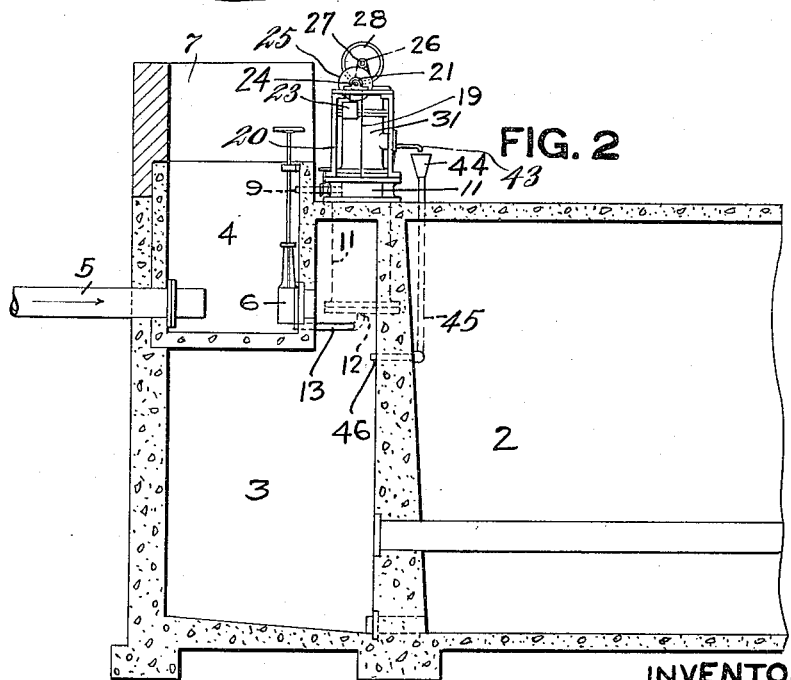

In the drawings Figure 1 is a plan view of a portion of a filter showing my proportional feed device in diagrammatic form applied thereto; Fig. 2 is a section on the line 2—2 Fig. 1; Fig. 3 is an enlarged vertical section of my improved feed device on the line 3—3 Fig. 1; and Fig. 4 is a section on the line 4—4 Fig. 1.

In the drawings I have illustrated my invention in connection with an ordinary filter in which the numeral 2 is the sedimentation basin, 3 is the tank for the mixing of the raw water and coagulant, and 4 is the inlet controlling chamber to which the raw water is fed by means of the pipe 5. This chamber 4 has the orifice valve 6 leading into the mixing chamber 3.

The chambers 7 and 8 contain the ingredients composing the coagulant and said chambers are provided with the valve controlled outlets 9 and 10. The tank 11 has the inlet 12 at the bottom thereof which is connected up by the pipe 13 to the chamber 4. A float 14 is contained within the tank 11, said float having the feet 15 which are adapted to rest on the bottom of the tank when the float is at its lowest position so that the inlet 12 will not be closed by said float. The tank 11 is provided with the guides 16 which are engaged by the guide-lugs 17 on the float 14 to prevent the rotation of said float and guide it accurately up and down within the tank 11. A clevis 18 is secured to the float 14 and connected to said clevis is the sprocket-chain 19. This chain 19 passes up through the casing 20 and over the sprocket-wheel 21 journaled in the bearing 22 at the upper end of the casing 20. The weight 23 is secured to the free end of the sprocket-chain 19.

The shaft 24 is connected to the sprocket-wheel 21 and said shaft carries the gear-wheel 25 which meshes with the pinion 26 on the shaft 27. This shaft 27 carries the bevel-gear 28 which meshes with the bevel-pinion 29 on the vertically movable stem 30. The stem 30 is square in cross section at its upper end where it is engaged by the pinion 29 and is movable up and down for a certain distance on said square portion moving in said pinion 29. The stem 30 is contained within the tank 31 and a float 32 is carried by the stem 30, said float engaging the threaded portion 33 of said stem. The float 32 is adapted to move up and down on the stem 30 but is held against rotary movement by the cleats 34 which act to guide said float in its vertical movement. The rollers 35 are carried by the float and engage the inner walls of the tank to prevent the float from binding on the sides of same.

The lower end of the stem 30 carries the valve 36 working in the valve-chamber 38. The inlet chamber 39 has the inlet 40 which communicates with the pipes 9 and 10 leading from the coagulant supply-chamber 7 and 8. The bottom of this inlet chamber 39 is inclined as at 41 to provide for the draining of said chamber through the drain tap 42. The tank 31 is provided with the outlet 43 controlled by a suitable valve 43$^a$ which delivers into the funnel 44. This funnel 44 is connected with the pipe 45 which enters the mixing tank 3 at 46.

When my invention is in use in connection with the filter its operation is as follows: The supply of coagulant is permitted to pass from the tanks 7 and 8 through the pipes 9 and 10 into the inlet chamber 39 and at the same time water is flowing into the reservoir 4. The inlet-control chamber 4 acts as a gage for the sedimentation chamber and the head in the chamber 4 is designed to pass a certain given quantity of water through the orifice valve 6 into mixing chamber 3. Accordingly as the head increases or diminishes in the chamber 4 the float 14 in the tank 11 will rise and fall.

The sprocket-chain 19 and the connections therefrom with the pinion 29 will act to turn the stem 30 and this turning of the stem 30 with the float 32 held against rotary movement will cause the float 32 to be raised and lowered on the stem 30 to correspond to the changed level in the tank 11. But independent of this movement said float 32 will rise and fall according to the amount of coagulant in the tank 31 and this rise and fall of the float connected to the stem 30 will operate the valve 36 and control the supply of coagulant passing through the orifices 38 into the tank 31 and through the opening 43 and pipe 45 of the mixing tank 3.

The inlet controlling valve 36 is a balanced valve and, when float 32 has been set at its relative height by the operating mechanism of float 14, the independent vertical movement of float 32 controls the supply of solution through the valve 36. As the head in the solution tanks 7 and 8 decreases, owing to the consumption of the solution, the opening through the valve 36 must be increased in order to supply the orifice 43 with the same or practically the same uniform rate of flow and the vertical movement of the valve stem through the opening in the pinion 29 is intended to provide the adjustment necessary for the control of this solution in its flow to the tank 31 to maintain a practically proportional head of discharge over the orifice outlet 43, through the mechanical operation of the float 14, sprocket wheels, etc. No matter at what elevation the coagulant in the tank 7 and 8 stands, as long as the coagulant of said tanks 7 and 8 is higher than the coagulant in tank 31, the operation of float 32 automatically increases or decreases orifices 38 to maintain a practically proportional head in the tank 31. The flow through orifice 6 in tank 4 and outlet 43 in tank 31 is thus practically proportional, minus, of course, the slightest difference in the efficiency of discharge of the two different sized orifices, which is immaterial, so far as practical results are concerned. The lowest solution level in tanks 7 and 8 must be, of course, at a height above the highest solution level in the tank 31 in order to make available for use the full amount of solution contained therein.

What I claim is:

1. In a proportional feed device for fluids, the combination of a tank, a float therein, connections between said tank and a fluid supply, a second tank having an inlet and outlet, a float therein, connections between said tank and a second fluid supply, a valve controlling the inlet of said second tank, connections between said valve and said last named float, and means for raising and lowering the position of said second float by the movement of said first float.

2. In a proportional feed device for fluids, the combination of a tank, a float therein, connections between said tank and a fluid supply, a second tank having an inlet and outlet, connections between said second tank and a second fluid supply, a vertically movable stem in said tank, a valve on said stem controlling said inlet, a float on said stem, and means for raising and lowering said float on said stem by the movement of said first named float.

3. In a proportional feed device for fluids, the combination of a tank, a float therein, connections between said tank and a fluid supply, a second tank having an inlet and outlet, connections between said second tank and a second fluid supply, a vertically movable threaded stem in said second tank, a valve connected to said stem controlling said inlet, a non-rotary float engaging said stem, and means for turning said stem by the movement of said first named float.

4. In a proportional feed device for fluids, the combination of a tank, a float contained therein, connections between said tank and a fluid supply, a second tank having an inlet and outlet, connections between said second tank and a second fluid supply, a vertically movable stem in said second tank, a valve carried by said stem controlling said inlet, a non-rotary float threaded on said stem, a pinion on said stem through which said stem is vertically movable, and connections between said pinion and said first named float for turning said pinion by the movement of said first named float.

5. In a proportional feed device for fluids, the combination of a tank, a float therein, connections between said tank and a fluid supply, a second tank having an inlet and outlet, connections between said second tank and a second fluid supply, a vertically movable stem in said second tank, a valve connected to said stem controlling said inlet, a non-rotary float threaded on said stem, a pinion engaging said stem and through which said stem is vertically movable, a sprocket chain connected to said first named float, a sprocket wheel over which said chain passes, a weight on said sprocket chain, and connections between said sprocket wheel and said pinion for rotating said stem.

In testimony whereof, I the said FREDERICK B. LEOPOLD have hereunto set my hand.

FREDERICK B. LEOPOLD.

Witnesses:
 ROBT. D. TOTTEN,
 ALVAR C. PURDY.